Patented Jan. 3, 1933

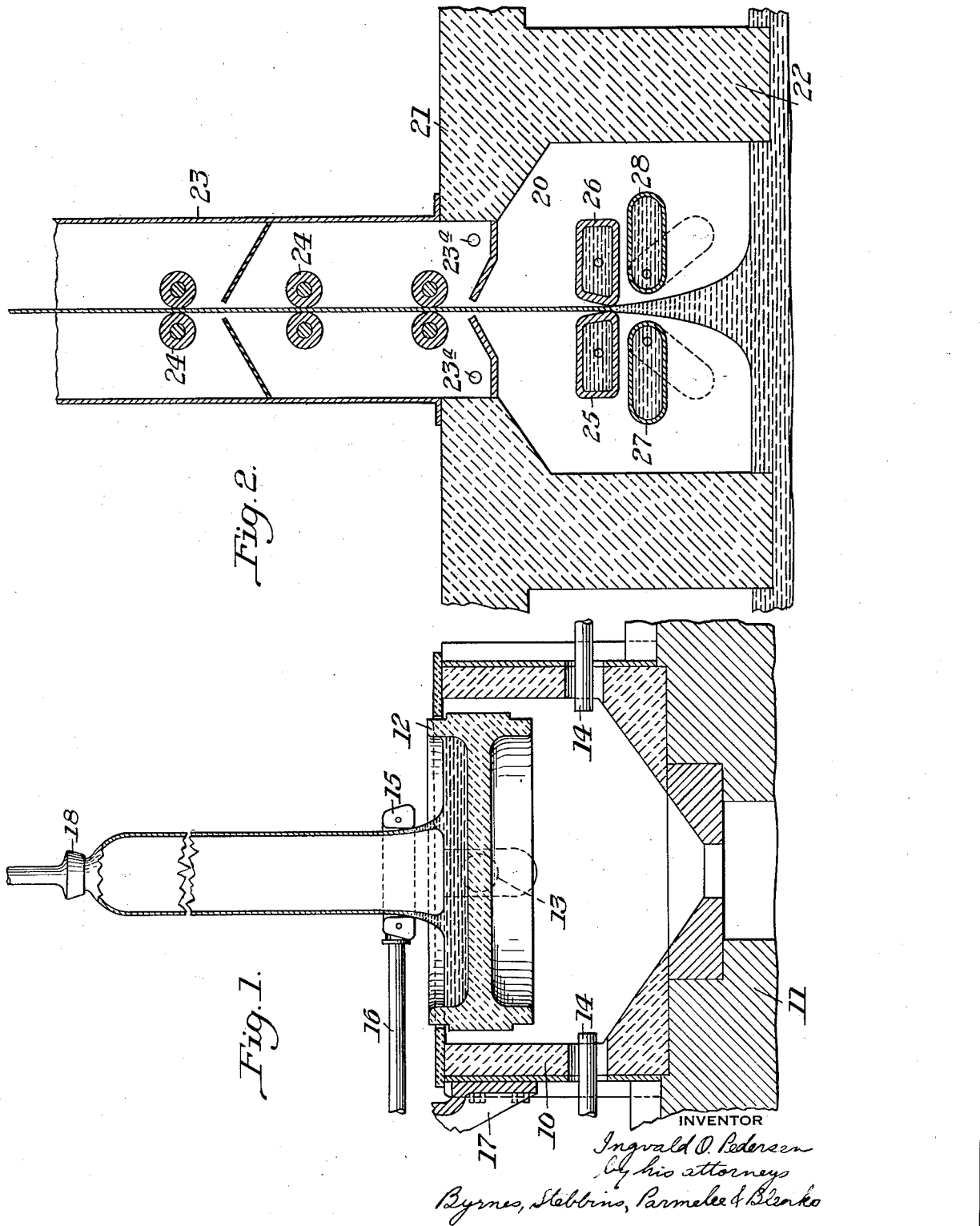

1,892,806

UNITED STATES PATENT OFFICE

INGVALD O. PEDERSEN, OF WILKINSBURG, PENNSYLVANIA

MANUFACTURE OF DRAWN GLASS

Application filed August 31, 1929. Serial No. 389,822.

My invention relates to the die drawing of glass from a molten glass bath for forming sheets, hollow articles, tubing, etc. The present invention relates particularly to after treatment of such die-drawn articles in order to make them stronger and less liable to breakage.

The drawing methods for producing such articles are set forth, for example, in my copending application Ser. No. 310,279, filed October 4, 1928, and in the copending application Ser. No. 369,271, filed June 6, 1929, of Pedersen & Byrnes.

In the drawing:—

Figure 1 is a vertical central section of a present preferred embodiment of the apparatus for practicing the invention in the drawing of cylinders, and Figure 2 is a partial section of an apparatus for drawing sheet glass.

Referring to Figure 1, a furnace 10 rests on suitable foundations 11. The furnace is adapted to receive a reversible pot 12 which is supported by trunnions 13. The furnace is provided with burners indicated schematically at 14 for maintaining the glass in the pot 12 at the proper temperature. A forming die 15 is supported above the surface of the molten mass contained in the pot 12 by means of an arm 16 which I find it convenient to secure to a bracket 17. The actual structure of this portion of the device is omitted since it is not part of the present invention.

A bait 18 is carried by suitable actuating mechanism which permits it to be raised and lowered. The bait 18 is hollow so that air under pressure may be passed therethrough.

In operation, the bait 18 is lowered through the die 15 into the molten mass of glass in the pot 12. The die 15 may be made up of a number of portions and these portions may be retractable as disclosed in the copending applications referred to above. After the bait 18 has secured a hold on a portion of the molten glass, it is raised slowly and the air pressure supplied therethrough causes the drawn glass to be formed hollow. As the bait is raised further, the outer surface of the hollow shape adhering to the bait engages the forming die 15. As mentioned above, the die 15 is so positioned with respect to the surface of the glass in the pot 12 that it exerts a forming and sizing effect on the drawn shape.

In Figure 2, I have shown a somewhat similar apparatus except that it is adapted especially for drawing a continuous glass sheet. In Figure 2, a drawing chamber 20 is formed in the forehearth of a glass-melting furnace by means of the roof 21 covering the forehearth and the side walls 22 depending from the roof. Above the drawing chamber, a vertical annealing leer 23 extends to any desired height. Burners 23a supply heat to the annealing leer. At spaced intervals along the length of the leer, driving rolls 24 are placed to move the drawn sheet upwardly. After the sheet has reached the top of the leer, it is cut into lengths after the usual manner.

The sheet-drawing apparatus of Figure 2 includes a pair of forming dies 25 and 26, as well as adjustable coolers 27 and 28. This apparatus is described and claimed in the copending application, Serial No. 369,271, referred to hereinabove and is shown herein merely as an example of the application of the present invention.

After the cylinder or sheet has been drawn from the pot or drawing chamber and cut into sections of suitable length, I subject these sections to a heat treatment which comprises slowly raising the temperature thereof to a value in excess of the critical point. After this temperature is reached, I slowly cool the sections to atmospheric temperature. Experiment has shown that, by heating the section slowly to a maximum temperature of 1000° F., the resulting product is of very good quality, free from internal strains and capable of withstanding a considerable degree of rough handling.

Although I have illustrated and described herein only two modifications of apparatus for practicing my invention, it is to be understood that changes and alterations may be made therein within the scope of the appended claims, the terms of which are the only limitations to be imposed on the scope of the invention.

I claim:

1. In the manufacture of glass articles, the steps consisting of continuously drawing tubular glass in contact with a forming die, cutting said drawn tube into setctions, slowly raising the temperature of each section above the critical point, and then reducing it slowly below the critical point.

2. In the manufacture of glass articles, the steps consisting of continuously drawing glass in contact with a forming die, cutting the drawn glass into sections, slowly raising the temperature of each section above the critical point, and then reducing it slowly below the critical point.

In testimony whereof I have hereunto set my hand.

INGVALD O. PEDERSEN.